Oct. 18, 1932.  S. GOERKE  1,883,695
FISH LURE
Filed Sept. 3, 1931
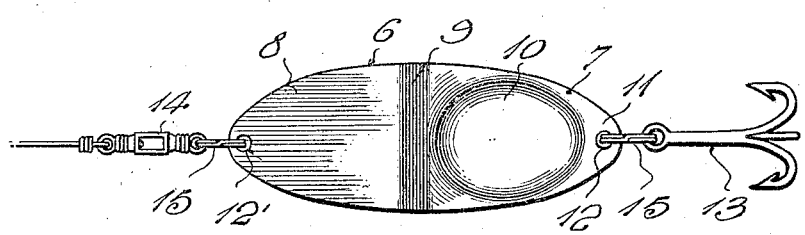
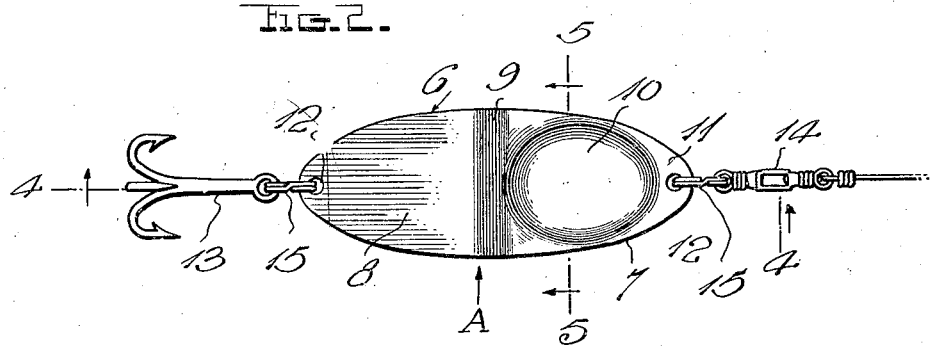
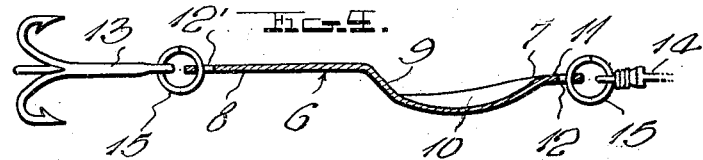
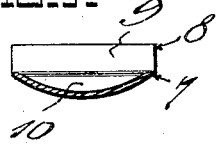
Inventor
Simon Goerke
Witness
H. Woodard
By H. D. Wilson & Co.
Attorneys.

Patented Oct. 18, 1932

1,883,695

UNITED STATES PATENT OFFICE

SIMON GOERKE, OF MILWAUKEE, WISCONSIN

FISH LURE

Application filed September 3, 1931. Serial No. 561,063.

The invention aims to provide an exceptionally simple and inexpensive, yet an efficient fish lure which, with a line swiveled to one end and a hook connected with its other end, will act as a positive spinner, whereas with the line connected with said other end and the hook swiveled to said one end, the device will rotate, tumble and zig-zag.

With the foregoing in view, the invention resides in the novel subject matter hereinafter described and claimed, description being accomplished by reference to the accompanying drawing.

Fig. 1 is a side elevation showing the device when used as a positive spinner.

Fig. 2 is a side elevation showing the relation of elements when it is desired that the device shall rotate, tumble and zig-zag.

Fig. 3 is an edge view looking in the direction of the arrow A of Fig. 2.

Fig. 4 is a horizontal sectional view on line 4—4 of Fig. 2.

Fig. 5 is a transverse sectional view on line 5—5 of Fig. 2.

The device embodies a thin plate preferably formed from sheet metal, said plate being denoted at 6 on the drawing. This plate is in the form of a relatively long and narrow ellipse and the two end portions 7 and 8 of said plate are laterally offset, providing an elongated rectangular shoulder 9 at their juncture, said shoulder extending throughout the width of the plate and having its length at right angles to the length of said plate. The end portion 7 of the plate 6 is stamped into concavo-convex form as shown at 10 but is provided with a substantially flat terminal 11 having an opening 12. The end 8 of the plate 6 is flat throughout its area, the flat end 11 being near the plane in which the flat plate end 8 lies. The extremity of this flat end 8 is provided with an opening 12'. In a sample device with which I have extensively experimented, the concavo-convex end of the plate is twisted a very slight amount as shown in Fig. 3.

For connection with opposite ends of the plate 6, I provide a hook 13 and a line swivel 14, appropriate rings or the like 15 being employed for passage through the openings 12 and 12' and through the eyes of the hook and swivel. When the line swivel 14 is attached to the end 8 of the plate 6, and the hook 13 is attached to the end 7 of said plate, the contrivance constitutes a positive spinner when drawn through the water, and it will rotate in one direction or the other, according to the direction in which it may start. When the line swivel 14 is attached to the concavo-convex end 7 of the plate 6, the device will rotate, tumble and zig-zag when drawn through the water. Hence, by simply interchanging the hook and the swivel, the action of the lure may be entirely changed.

I attribute the differences in action when pulling the plate in opposite directions, to the relation of the shoulder 9 with the flat plate end 8 and the concavo-convex end 7, and it will be observed that said shoulder is in a plane oblique to the length of the plate.

Preferably, the plate 6 is plated with some bright shiny metal, one side of the end 8 is painted or otherwise decorated, and the other side of the end 7 is similarly painted or decorated, making the device a very attractive and efficient lure.

I claim:—

1. A fish lure comprising a thin plate of elongated elliptical shape and having its two end portions relatively offset, providing an abrupt elongated shoulder whose length extends throughout the width of said plate at right angles to the length of the latter, said shoulder being disposed in a plane oblique to said length of the plate, one of said end portions of the plate being of concavo-convex form with its concave side disposed toward said shoulder, the other of said end portions being flat, means for connecting a hook to one end of said plate, and means for connecting a line to the other end of said plate.

2. A fish lure comprising a thin plate of elongated elliptical shape and having its two end portions relatively offset, providing an abrupt elongated shoulder whose length extends throughout the width of said plate at right angles to the length of the latter, said shoulder being disposed in a plane oblique to said length of the plate, one of said end portions of the plate being of concavo-convex form with its concave side disposed toward said shoulder, the other of said end portions being flat, a hook loosely connected to the flat end of said plate, and a line swivel connected with the concavo-convex end thereof, whereby said plate will rotate, tumble and zig-zag when drawn through the water.

In testimony whereof I affix my signature.

SIMON GOERKE.